United States Patent Office 2,725,807
Patented Dec. 6, 1955

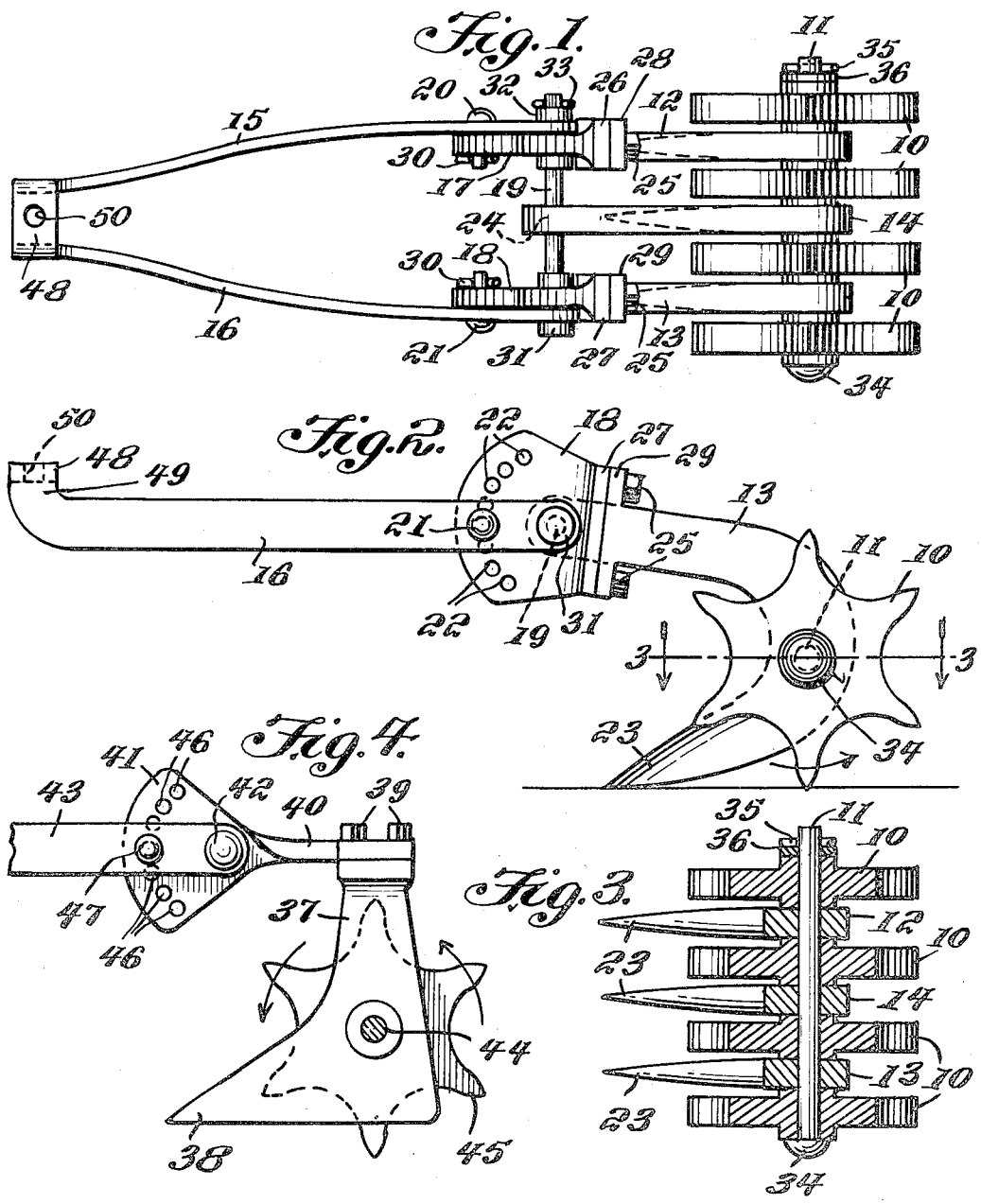

2,725,807

ROTARY HARROW

James Monroe Sibert, Crowley, La.; Worth A. Sibert, administrator of said James Monroe Sibert, deceased Application September 29, 1953, Serial No. 382,945

1 Claim. (Cl. 97—4)

This invention relates to harrows of the disc type in which the discs are replaced wth toothed wheels and in which the toothed wheels are journaled in stationary arcuate prongs that are adjustably connected to a drawbar by which the device is attached to a tractor or the like.

The purpose of this invention is to provide a harrow that is particularly adapted for breaking up and pulverizing lumps of dirt.

In numerous instances and particularly where soil is plowed with considerable moisture therein the soil is baked into hard lumps by the sun and it is difficult to break the lumps by conventional means. With this thought in mind this invention contemplates a harrow having rotating toothed wheels mounted between hook shaped prongs or teeth and in which the teeth are connected to a drawbar with adjustable means whereby the angle between the teeth and drawbar may be set to correspond with the condition of the soil.

The object of this invention is, therefore, to provide a harrow that is particularly adapted for breaking up hard lumps of soil.

Another object of the invention is to provide a harrow having toothed wheels alternated with hook-like prongs whereby the angle of the hook-like prongs in relation to a drawbar for attaching the device to a tractor is adjustable.

A further object of the invention is to provide a harrow having rotary toothed wheels in combination with prongs in which the device is of a simple and economical construction.

With these and other objects and advantages in view the invention embodies a drawbar in the form of a yoke having spaced arms with spaced hook like prongs adjustably mounted on the arms and with toothed rotary wheels spaced between and journaled in the prongs.

Other features and advantages of the invention will appear from the following description taken in connection with the drawing, wherein:

Figure 1 is a plan view of the improved rotary toothed harrow.

Figure 2 is an end elevational view of the harrow.

Figure 3 is a sectional plan through the prongs and toothed wheels taken on line 3—3 of Fig. 2.

Figure 4 is an end elevational view, similar to that shown in Fig. 2 illustrating a modification wherein the prongs between the toothed wheels are L-shaped.

Referring now to the drawing wherein like reference characters denote corresponding parts the improved rotary toothed harrow of this invention includes toothed wheels 10, rotatably mounted on a shaft 11 with prongs 12 and 13 positioned between the end discs and a prong 14 at the center and with the prongs 12 and 13 connected to arms 15 and 16 of a drawbar through segments 17 and 18 respectively, the segments being mounted on a shaft member 19 and the arms of the drawbar being retained in angular relation to the segments with pins 20 and 21 extended through openings in the arms and positioned to extend through spaced openings or apertures 22 in the segments.

Each of the prongs is provided with a point 23 and the center prong 14 is pivotally mounted on the shaft 19 with the shaft extended through an opening 24 therein.

The end prongs 12 and 13 are secured by bolts 25 to flanges 26 and 27 of the segments, the bolts extending through flanges 28 on the end of the prong 12 and flanges 29 on the end of the prong 13.

The pins 20 and 21 are secured in position with cotter pins 30 and, as illustrated in Fig. 2, the angular relation between the prongs 12, 13, and 14 and the arms of the drawbar is readily adjustable by withdrawing the pins 20 and 21, moving the arms of the drawbar in relation to the segments and inserting the pins in different openings.

The shaft 19 is provided with a head 31 on one end and a collar 32 on the other and the parts are retained in assembled relation with a cotter pin or other fastener as indicated by the numeral 33.

The shaft 11 is also provided with a head, as indicated by the numeral 34 and the shaft is secured in position with a cotter pin 35. A washer 36 may be provided between the cotter pin or fastener 35 and the hub of the toothed wheel 10.

In the design illustrated in Fig. 4 substantially L-shaped prongs 37, having points 38, are secured by bolts 39 to arms 40 of segments 41 and the segments are pivotally mounted by a shaft having a head 42 in arms 43 of a drawbar or the like.

A shaft 44, similar to the shaft 11 extends through the arms 37 and two wheels 45, similar to the wheels 10 are rotatably mounted on the shaft. The segments 41 are provided with spaced openings 46 by which the segments are adjustably connected to the drawbar 43, the drawbar having pins 47 that extend through the opening 46 of the segments.

The arms of the drawbar may be connected with a plate or saddle 48 at the ends opposite to the ends in which the harrow is carried and, as shown in Fig. 2 the ends on which the plate is positioned may be turned upwardly as shown at the point 49. The plate 48 may also be provided with an opening 50 for a kingpin or the like.

With the parts assembled as illustrated and described the drawbar is connected to a tractor or other towing vehicle and as the device is drawn over the ground the points 23 of the prongs plow into the ground as the teeth of the rotating disc 10 engage and work into the lumps of soil and the like between the teeth. By this means substantially rough or lumpy soil may be reduced to a pulverized state.

It will be understood that modifications, within the scope of the appended claim, may be made in the design and arrangement of the parts without departing from the spirit of the invention.

What is claimed is:

In a toothed wheel harrow, a horizontally disposed shaft, a plurality of toothed discs rotatably mounted on said shaft, a pair of prongs interposed between the discs adjacent the ends of said shaft, and a central prong between said pair of prongs also mounted on said shaft, a drawbar including spaced apart arms, a shaft member supported by said arms, segments mounted on said shaft member, there being a plurality of spaced apertures in said segments, said arms having openings registering with said apertures, pins extending through said registering openings and apertures, each of said prongs being provided with a point, the central prong being provided with an opening rotatably receiving said shaft member, said segments having flanges secured to flanges on the end prong, said shaft member having a head on one end thereof and a collar on the other end thereof, said arms including upturned end portions, and a saddle connecting the upturned end portions of said arms together, there being an opening in said saddle.

References Cited in the file of this patent

UNITED STATES PATENTS

| | | |
|---|---|---|
| 289,258 | Helman | Nov. 27, 1883 |
| 1,218,541 | Fletcher | Mar. 6, 1917 |
| 1,478,305 | Stroback | Dec. 18, 1923 |
| 2,539,136 | Hite | Jan. 23, 1951 |
| 2,596,579 | McKay | May 13, 1952 |
| 2,664,040 | Beard | Dec. 29, 1953 |